United States Patent
Lu et al.

(10) Patent No.: US 11,670,774 B2
(45) Date of Patent: Jun. 6, 2023

(54) PITCH-BASED NEGATIVE ELECTRODE MATERIAL FOR SODIUM-ION BATTERY, AND PREPARATION METHOD THEREFOR AND APPLICATIONS THEREOF

(71) Applicants: Beijing HiNa Battery Technology Co., Ltd., Beijing (CN); Institute of Physics, The Chinese Academy of Sciences, Beijing (CN)

(72) Inventors: Yaxiang Lu, Beijing (CN); Yongsheng Hu, Beijing (CN); Kun Tang, Beijing (CN); Hong Li, Beijing (CN); Xuejie Huang, Beijing (CN); Liquan Chen, Beijing (CN)

(73) Assignees: Beijing HiNa Battery Technology Co., Ltd., Beijing (CN); Institute of Physics, The Chinese Academy of Sciences, Beijing (CN)

( * ) Notice: Subject to any disclaimer, the term of this patent is extended or adjusted under 35 U.S.C. 154(b) by 232 days.

(21) Appl. No.: 16/650,606

(22) PCT Filed: Sep. 4, 2018

(86) PCT No.: PCT/CN2018/104034
§ 371 (c)(1),
(2) Date: Mar. 25, 2020

(87) PCT Pub. No.: WO2019/062494
PCT Pub. Date: Apr. 4, 2019

(65) Prior Publication Data
US 2021/0202942 A1  Jul. 1, 2021

(30) Foreign Application Priority Data
Sep. 26, 2017 (CN) .......................... 201710880097.3

(51) Int. Cl.
*H01M 4/04* (2006.01)
*H01M 4/133* (2010.01)
(Continued)

(52) U.S. Cl.
CPC ......... *H01M 4/583* (2013.01); *H01M 4/0442* (2013.01); *H01M 4/133* (2013.01);
(Continued)

(58) Field of Classification Search
CPC .... H01M 4/583; H01M 4/0442; H01M 4/133; H01M 4/1393; H01M 4/049;
(Continued)

(56) References Cited

U.S. PATENT DOCUMENTS 5,741,472 A   4/1998 Sonobe et al.

FOREIGN PATENT DOCUMENTS

CN   106159198 A      11/2016
JP   2006164570 A  *  6/2006
(Continued)

OTHER PUBLICATIONS

EPO machine generated English translation of JP 2014-203530-A (Year: 2014).*

(Continued)

*Primary Examiner* — Christopher P Domone
*Assistant Examiner* — Kimberly Wyluda
(74) *Attorney, Agent, or Firm* — TraskBritt

(57) ABSTRACT

Embodiments of the present disclosure are a pitch-based negative electrode material for a sodium-ion battery and related methods and applications. The method comprises: placing a pitch recursor into a muffle furnace to allow the pitch precursor to experience pre-oxidation for 2 to 6 hours at a temperature ranging from 200° C. to 350° C., to obtain pre-oxidized pitch; placing the pre-oxidized pitch into a high-temperature carbonization furnace, and increasing the (Continued)

- 110 — Asphalt precursor is put into a muffle furnace for pre-oxidation at 200° C-350° C for 2-6 hours to obtain pre-oxidized asphalt

- 120 — Pre-oxidized asphalt is put into a high-temperature carbonization furnace, the temperature is raised to 1000°C-1800°C at a heating rate of 0.5°C/min-5°C/min, and heat treatment is performed on the pre-oxidized asphalt in an inert atmosphere for 1-10 hours, so that the pre-oxidized asphalt undergoes carbonization and cracking reactions

- 130 — Pre-oxidized asphalt is cooled to room temperature to obtain an irregular block-shaped amorphous carbon material, which is the negative electrode material for the sodium-ion battery temperature to 1300° C. to 1600° C. at a temperature increase speed of 0.5° C./min to 5° C./min, and carrying out thermal treatment on the pre-oxidized pitch in an inert atmosphere for 1 to 10 hours, to allow the pre-oxidized pitch to experience carbonization reactions, oxygen in the pre-oxidized pitch being used for breaking an ordered structure of the pitch during the carbonization of the pre-oxidized pitch, so as to form a wedge-shaped voids disordered structure.

19 Claims, 11 Drawing Sheets

(51) Int. Cl.
  *H01M 4/1393*    (2010.01)
  *H01M 10/054*    (2010.01)
  *H01M 4/583*     (2010.01)
  *H01M 4/02*      (2006.01)
  *H01M 4/587*     (2010.01)

(52) U.S. Cl.
  CPC ....... *H01M 4/1393* (2013.01); *H01M 10/054* (2013.01); *H01M 4/049* (2013.01); *H01M 4/0471* (2013.01); *H01M 4/587* (2013.01); *H01M 2004/027* (2013.01)

(58) Field of Classification Search
  CPC .. H01M 4/0471; H01M 4/587; H01M 10/054; H01M 2004/027
  See application file for complete search history.

(56) References Cited

FOREIGN PATENT DOCUMENTS

| | | | |
|---|---|---|---|
| JP | 2014-203530 A | | 10/2014 |
| JP | 2015026520 A | * | 2/2015 |
| JP | 2017107856 A | * | 6/2017 ............. Y02E 60/10 |

OTHER PUBLICATIONS

EPO machine generated English translation of JP 2015-026520-A (Year: 2015).*
EPO machine generated English translation of JP 2006-164570-A (Year: 2006).*
Merriam-Webster definition of "raw material". (Year: 2005).*
Merriam-Webster definition of "raw". (Year: 2009).*
EPO machine generated English translation of JP-2017107856-A (Year: 2017).*
International Search Report for International Application No. PCT/CN2018/104034 dated Dec. 6, 2018, 2 pages.
International Written Opinion for International Application No. PCT/CN2018/104034 dated Dec. 6, 2018, 3 pages.
Zhang et al., Effects of Pre-Oxidation Time on the Mesophase Pitch and Its Carbon Foams, Journal of Hunan University (National Sciences), vol. 37, No. 10, (Oct. 2010), pp. 67-71.
Jian et al. Study on Asphalten-based activated Carbon Fiber 1. Non-melting treatment of Asphaltene fiber, Polymer Materials Science and Engineering, No. 5, (Sep. 1994), pp. 124-128.

\* cited by examiner

PITCH-BASED NEGATIVE ELECTRODE MATERIAL FOR SODIUM-ION BATTERY, AND PREPARATION METHOD THEREFOR AND APPLICATIONS THEREOF

CROSS-REFERENCE TO RELATED APPLICATIONS

This application is a national phase entry under 35 U.S.C. § 371 of International Patent Application PCT/CN2018/104034, filed Sep. 4, 2018, designating the United States of America and published as International Patent Publication WO 2019/062494 A1 on Apr. 4, 2019, which claims the benefit under Article 8 of the Patent Cooperation Treaty to Chinese Patent Application Serial No. 201710880097.3, filed Sep. 26, 2017.

TECHNICAL FIELD

The present disclosure relates to the technical field of new energy storage devices, and more particularly, to a pitch-based negative electrode material for a sodium-ion battery, and a preparation method therefor and an application thereof.

BACKGROUND

As the most efficient and convenient energy storage device, high-performance secondary batteries are essential for establishing a clean energy system and realizing large-scale energy storage. Sodium-ion batteries are considered to be a beneficial supplement to lithium-ion batteries due to their advantages of abundant resources, wide distribution and low cost, and are one of ideal devices used in large-scale energy storage. It has great strategic significance for research and development of sodium-ion battery technology, and has received wide attention from various research groups all over the world in recent years.

The development of high-performance electrode materials is crucial to commercialization of the sodium-ion batteries. Up to now, some progress has been made in the research of sodium-ion positive materials. Sodium-ion layered oxides, tunnel oxides, polyanionic compounds and Prussian blue materials have been reported to have a certain capacity and cycle performance. In terms of negative electrode materials, since the danger of metal sodium and the formation of sodium dendrites are easy to lead to potential safety hazards and other problems caused by short circuit of liquid batteries, metal sodium cannot be directly use a negative electrode in the sodium-ion batteries. In addition, due to the thermodynamic instability of graphite and sodium, graphite does not have an ability to store sodium. Therefore, the development of the negative electrode materials is the key to promote the practicality of the sodium-ion batteries.

In reported negative electrode materials for the sodium-ion batteries, disordered carbon materials have become the most promising negative electrode materials for the sodium-ion batteries due to their advantages such as relatively low sodium storage potential, high sodium storage capacity and good cycle stability. Reported precursors for preparing the disordered carbon materials mainly include some polymers, biomass, resins, or organic chemicals, etc. However, the high price, complex preparation process and low carbon yield of these precursors greatly restrict the large-scale application of the disordered carbon materials as negative electrodes of the sodium-ion batteries. Pitch, as a common residue in petroleum industry, is very low in price. In addition, since the pitch is mainly composed of a mixture of some alkanes, cycloalkanes and aromatic hydrocarbons, it has a high carbon content. Therefore, the pitch is an ideal precursor for preparing carbon materials. However, in the process of high-temperature carbonization, the pitch is easy to be graphitized to form a highly ordered carbon layer structure, which is not conducive to the storage of sodium-ions, resulting in a low sodium storage capacity, about 90 mAh/g.

BRIEF SUMMARY

The purpose of the present disclosure is to provide a pitch-based negative electrode material for a sodium-ion battery, and a preparation method therefor and an application thereof. The pitch with low cost is used as a raw material, and the structure of the pitch is modified through pre-oxidation at low temperature, so that the ordered structure of the pitch in the process of high-temperature carbonization is broken, the disorder degree of the pitch is enhanced to improve the sodium storage capacity, and the carbon yield is improved. Therefore, the disordered carbon material, which is low in cost, simple in preparation process, adjustable in disorder degree, high in carbon yield and suitable for large-scale production is provided, and is used as the negative electrode material in the sodium-ion secondary battery.

To achieve the above purpose, in a first aspect, an embodiment of the present disclosure provides a preparation method for a pitch-based negative electrode material for a sodium-ion battery, including:

putting a pitch precursor into a muffle furnace for pre-oxidation at a temperature of 200° C.-350° C. for 2-6 hours to obtain pre-oxidized pitch;

putting the pre-oxidized pitch into a high-temperature carbonization furnace, wherein the temperature is raised to 1300° C.-1600° C. at a heating rate of 0.5° C./min-5° C./min, and performing heat treatment on the pre-oxidized pitch in an inert atmosphere for 1-10 hours, so that the pre-oxidized pitch undergoes carbonization and cracking reactions; wherein oxygen in the pre-oxidized pitch is used for breaking an ordered structure of the pitch and forming a disordered structure with wedge-shaped voids in a process of the carbonization of the pre-oxidized pitch; and cooling the pre-oxidized pitch to room temperature to obtain an irregular block-shaped disordered carbon material, which is the negative electrode material for the sodium-ion battery.

Preferably, the pre-oxidation is performed in an air or oxygen atmosphere.

Preferably, a pre-oxidation temperature is 280° C.-320° C.

Preferably, a pre-oxidation temperature is 300° C.

Preferably, the pitch precursor is one or a mixture of a plurality of coal tar pitch, petroleum pitch and natural pitch.

In a second aspect, an embodiment of the present disclosure provides the negative electrode material for the sodium-ion battery prepared by the preparation method described in the first aspect, the negative electrode material for the sodium-ion battery is an irregular block-shaped disordered carbon material.

Preferably, the irregular block-shaped disordered carbon material has a size of 0.5 μm-3 μm, a $d_{002}$ value of 0.36 nm-0.39 nm, an $L_c$ value of 0.9 nm-1.2 nm, and an $L_a$ value of 3 nm-5 nm, and internal carbon layers are arranged in a disorderly stacking manner to form a microstructure with the wedge-shaped voids, which constitutes active sites for sodium storage.

In a third aspect, an embodiment of the present disclosure provides a negative electrode of a sodium-ion battery, the negative electrode includes: a current collector, a binder coated on the current collector, and the negative electrode material for the sodium-ion battery described in the second aspect coated on the current collector.

In a fourth aspect, an embodiment of the present disclosure provides the sodium-ion secondary battery including the negative electrode described in the third aspect, the sodium-ion secondary battery is used for mobile equipment, vehicles, energy storage equipment for renewable energy generation, and smart grid peak regulation, distributed power stations, backup power supplies or communication base stations.

According to the preparation method for the pitch-based negative electrode material for the sodium-ion battery provided by the embodiments of the present disclosure, the pitch with low cost is used as a raw material, and the ordered structure of the pitch is broken through the pre-oxidation process on the pitch. The disordered carbon material, which is low in cost, simple in preparation process, adjustable in disorder degree, high in carbon yield and suitable for large-scale production is provided, and is used as the negative electrode material in the sodium-ion secondary battery. The sodium-ion secondary battery employing the negative electrode material of the present disclosure has high reversible capacity and energy density, excellent rate performance, stable cycle performance, and good safety performance, and may be used not only for power supplies of mobile equipment and electric vehicles, but also for large-scale energy storage equipment for renewable energy generation, smart grid peak regulation, distributed power stations, backup power supplies or communication base stations.

DETAILED DESCRIPTION

Technical solutions of the present disclosure will be further described in detail below through accompanying drawings and embodiments.

Figure 1:
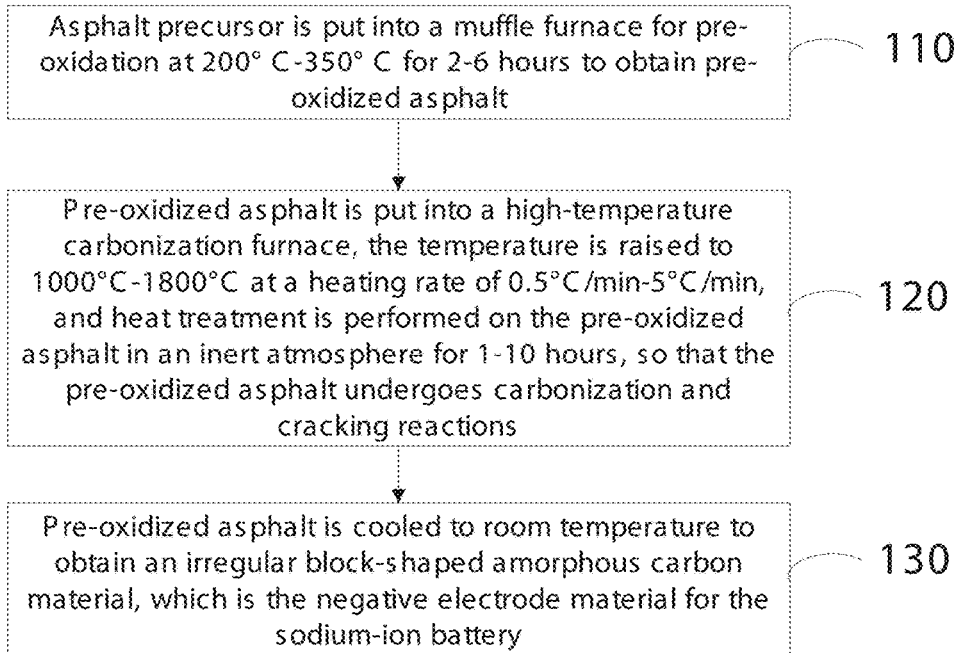
FIG. 1 is a flowchart illustrating a preparation method for a pitch-based negative electrode material for a sodium-ion battery according to embodiment 1 of the present disclosure.

FIG. 1 is a preparation method for a pitch-based negative electrode material for a sodium-ion battery according to an embodiment of the present disclosure. The steps are shown in FIG. 1, including:

Step 110: a pitch precursor is put into a muffle furnace for pre-oxidation at a temperature of 200° C.-350° C. for 2-6 hours to obtain pre-oxidized pitch.

Specifically, there are a plurality of preferred combinations of control conditions such as the pre-oxidation temperature of the pitch, pre-oxidation time under this temperature range and composition of pre-oxidation atmospheres.

For example, the pre-oxidation may be carried out in an air or oxygen atmosphere. The pre-oxidation temperature preferably ranges from 280° C.-320° C., and further preferably 300° C.

Specifically, the pitch is one or a mixture of a plurality of coal tar pitch, petroleum pitch and natural pitch.

Figure 2:
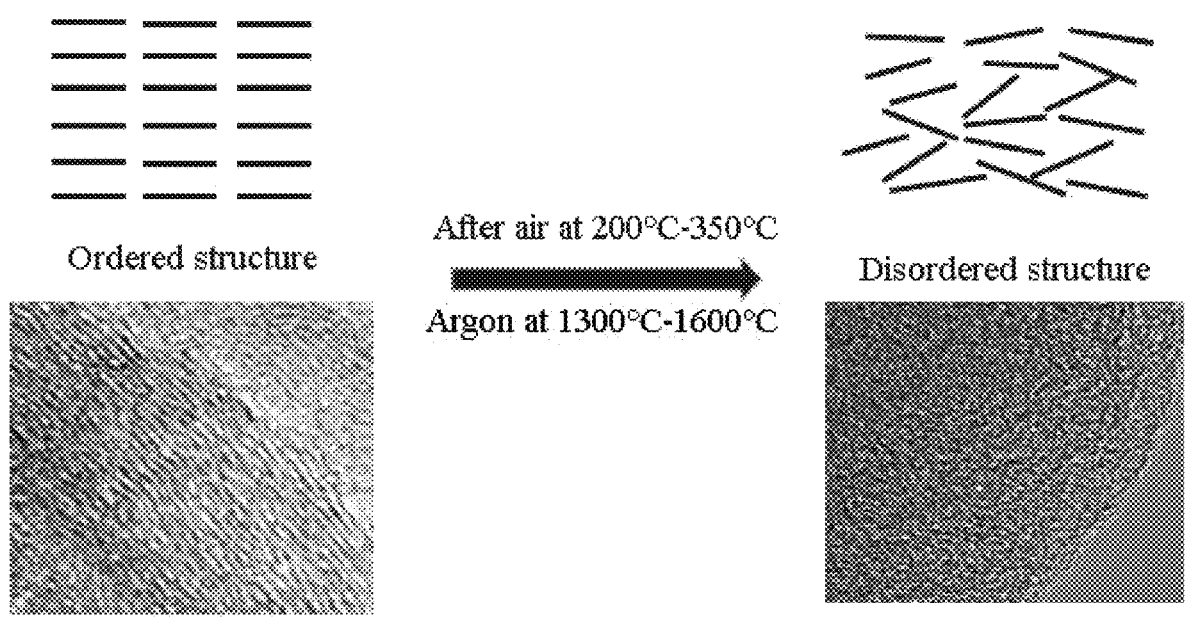
FIG. 2 is a schematic diagram illustrating a disordered structure with wedge-shaped voids is formed from an ordered structure of the pitch as described in embodiment 1 of the present disclosure.

Step 120: the pre-oxidized pitch is put into a high-temperature carbonization furnace, the temperature is raised to 1300° C.-1600° C. at a heating rate of 0.5° C./min-5° C./min, and heat treatment is performed on the pre-oxidized pitch in an inert atmosphere for 1-10 hours, so that the pre-oxidized pitch undergoes carbonization and cracking reactions;

wherein oxygen in the pre-oxidized pitch is used for breaking an ordered structure of the pitch and forming a disordered structure with wedge-shaped voids in the process of the carbonization of the pre-oxidized pitch (as shown in FIG. 2). The carbon yield is increased and the cost is further reduced.

The inert gas introduced is preferably argon.

Step 130: the pre-oxidized pitch is cooled to room temperature to obtain an irregular block-shaped disordered carbon material, which is the negative electrode material for the sodium-ion battery.

Specifically, natural cooling may be used for cooling, and the pre-oxidized pitch is taken out from the tubular furnace after being cooled to the room temperature to obtain the irregular block-shaped disordered carbon material, namely the negative electrode material for the sodium-ion battery.

The pre-oxidized pitch-based pyrolytic disordered carbon material provided by the present embodiment has a simple preparation process, high production efficiency and low raw material cost, and is suitable for large-scale production. By controlling the pre-oxidation temperature, the pre-oxidation time and the pre-oxidation atmosphere of the pitch, an ordered structure of the pitch can be broken, active sites for sodium storage are increased, and a favorable structure for sodium storage may be obtained. The microstructure of the disordered carbon material may be further adjusted and controlled by adjusting the carbonization temperature, so that the disordered carbon material with the best electrochemical performance may be obtained according to different requirements and used as a negative electrode active material for a sodium-ion secondary battery.

Structural characteristics of the prepared negative electrode material for the sodium-ion battery will be described below through embodiment 2.

Embodiment 2

The present embodiment provides the negative electrode material for the sodium-ion battery prepared in embodiment 1.

Figure 3:
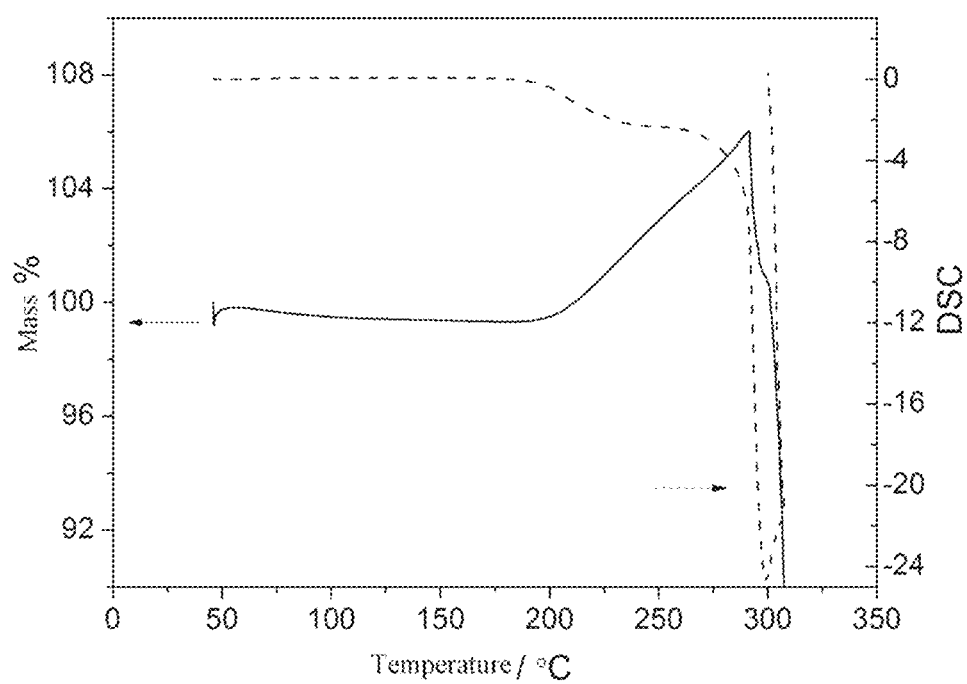
FIG. 3 is a thermogravimetric curve diagram illustrating an pitch raw material described in embodiment 2 of the present disclosure.
Figure 4A:
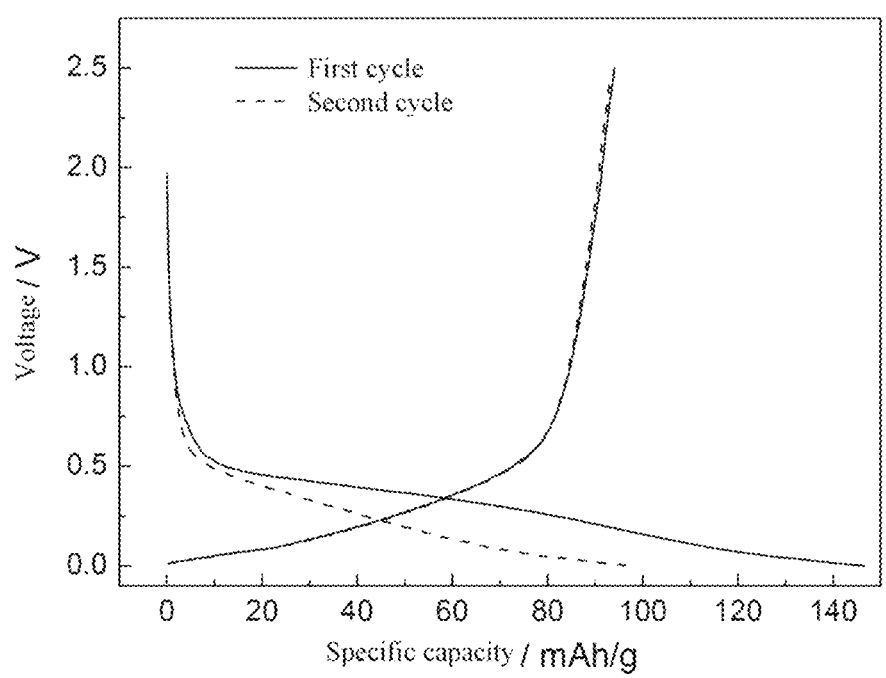
FIG. 4a is a constant current charge-discharge curve diagram illustrating direct high-temperature carbonized pitch for comparison described in embodiment 2 of the present disclosure.
Figure 4B:
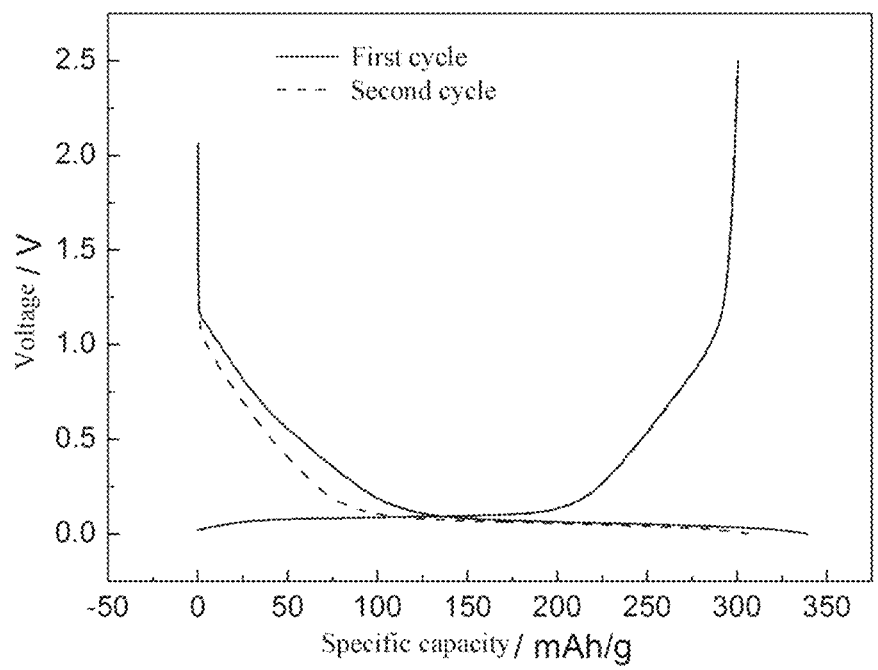
FIG. 4b is a constant current charge-discharge curve diagram illustrating pre-oxidized and high-temperature carbonized pitch described in embodiment 2 of the present disclosure.

By controlling the pre-oxidation temperature, the pre-oxidation time, the pre-oxidation atmosphere of the pre-oxidized pitch, and the carbonization temperature of the pre-oxidized pitch under the inert atmosphere, the ordered structure of the pitch is broken, and the irregular block-shaped negative electrode material is prepared. The irregular block-shaped disordered carbon material prepared by the pre-oxidation and carbonization of the pitch has a size of 0.5 µm-3 µm, a $d_{002}$ value of 0.36 nm-0.39 nm, an $L_c$ value of 0.9 nm-1.2 nm, and an $L_a$ value of 3 nm-5 nm. FIG. 3 shows a thermogravimetric curve and differential scanning calorimetry curve of pitch raw material kept at 300° C. for 6 hours in a mixed atmosphere of oxygen and argon. It can be seen that after 200° C. the pitch weight increases significantly with the increase of the pre-oxidation temperature, accompanied by a large amount of heat release, and then the pitch weight decreases with prolongation of holding time at about 290° C. FIG. 4a is a charge-discharge curve diagram of a comparative embodiment of the present embodiment, and shows a constant current charge-discharge curve diagram of the pitch through direct high-temperature carbonization without a pre-oxidation step as the negative electrode material for the sodium-ion battery. FIG. 4b shows a constant current charge-discharge curve diagram of an irregular carbon material obtained by high-temperature carbonization at the same temperature after the pre-oxidation of the pitch as the negative electrode material for the sodium-ion battery.

From the charge-discharge curves, it can be seen that the directly high-temperature carbonized pitch mainly shows high potential slope capacity, with almost no low-potential plateau capacity, and the reversible capacity is about 94 mAh/g. At the same time, the pre-oxidized and carbonized pitch has both high potential slope capacity and low potential plateau capacity, and the reversible capacity is about 300.6 mAh/g.

According to the negative electrode active material for the sodium-ion secondary battery of the present embodiment, the pitch with low cost is used as the raw material, and through the procedures of pre-oxidation and carbonization, the phenomenon that the pitch shows an ordered arrangement of carbon layers under high-temperature carbonization is broken, the disordered structure of the pitch is regulated and controlled, the microstructure with wedge-shaped voids is formed, active sites for sodium storage are increased, the performance of the negative electrode material is improved, and the comprehensive electrochemical performance of the pitch in the sodium-ion battery is facilitated to be improved.

In order to better understand technical solutions provided by the present disclosure, the following specific examples are used to illustrate the specific process of preparing pitch-based high-capacity negative electrode material provided by the above embodiments of the present disclosure, the method of assembling the pitch-based high-capacity negative electrode material as the negative electrode material for the sodium-ion secondary battery, and battery characteristics thereof.

Embodiment 3

Figure 5:
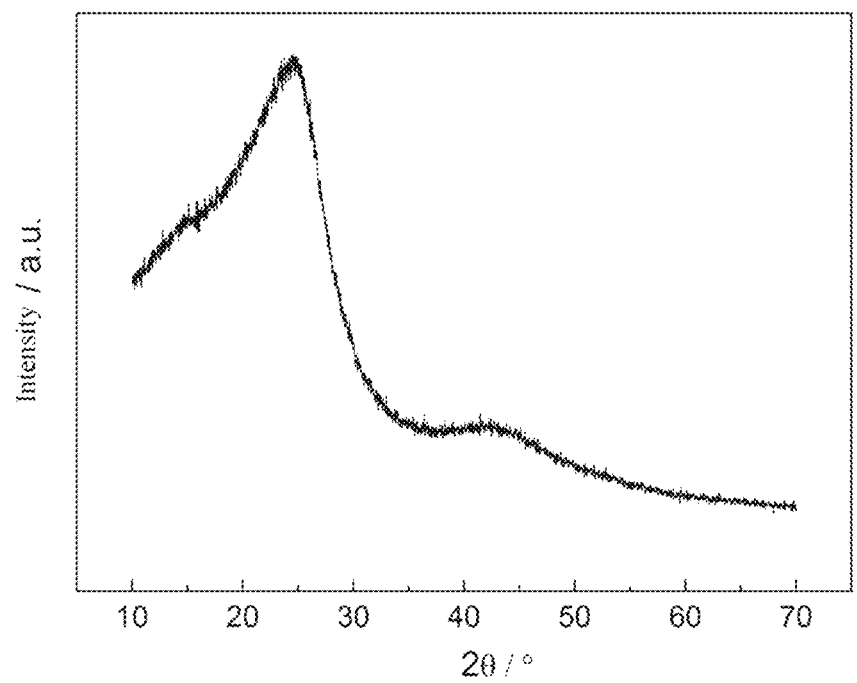
FIG. 5 is an X-ray diffraction XRD pattern illustrating pre-oxidized pitch according to embodiment 3 of the present disclosure.
Figure 6:
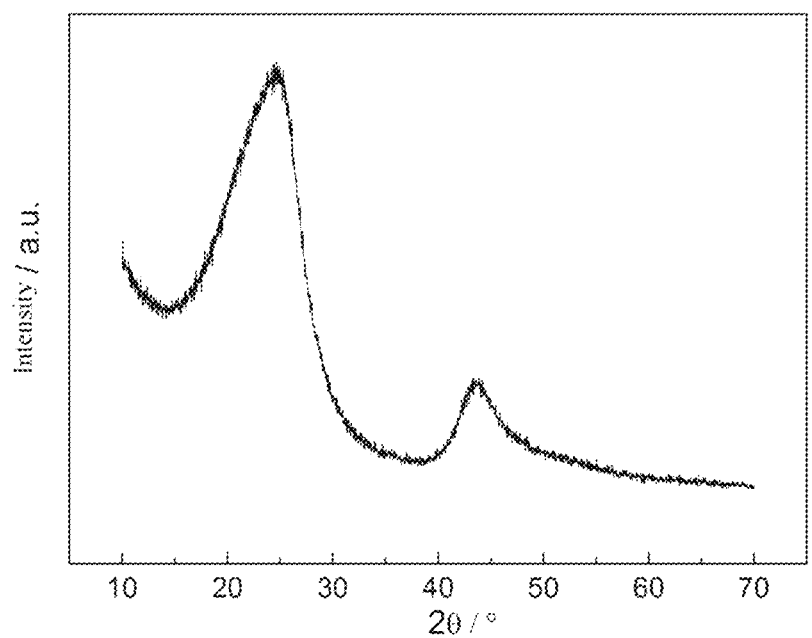
FIG. 6 is an XRD pattern illustrating a disordered carbon according to embodiment 3 of the present disclosure.
Figure 7:
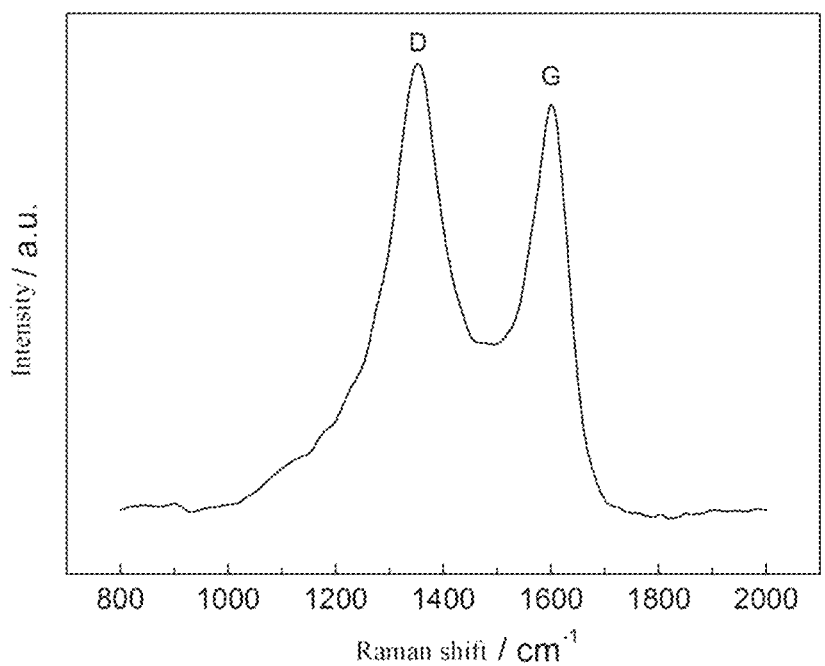
FIG. 7 is a Raman spectrum illustrating a disordered carbon according to embodiment 3 of the present disclosure.
Figure 8:
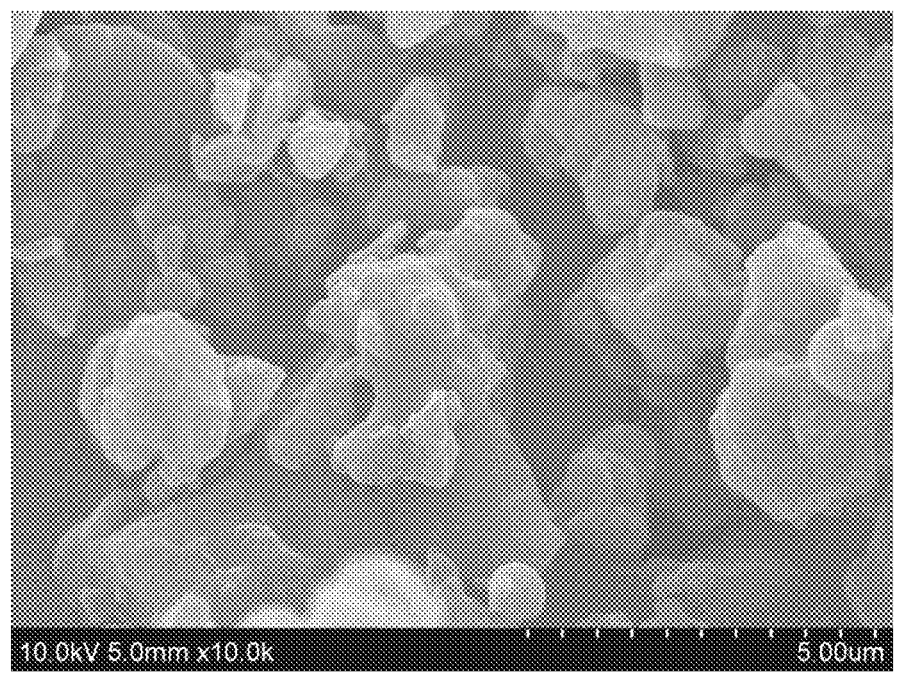
FIG. 8 is a scanning electron microscope (SEM) diagram illustrating disordered carbon according to embodiment 3 of the present disclosure.

2 g of pitch raw material is weighed, put in a crucible, and placed into a muffle furnace. The temperature is raised to 300° C. at a rate of 3° C./min, and kept for 3 hours to obtain pre-oxidized pitch. The mass percentage of the pre-oxidized pitch is 103.9%, which indicates that the pitch has gained weight during the pre-oxidation. FIG. 5 is an XRD pattern of the pre-oxidized pitch. The pre-oxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 67.4%. The XRD pattern of the disordered carbon material obtained by the carbonized pitch is shown in FIG. 6. It can be seen that $d_{002}=0.362$ nm and $L_c=1.161$ nm of the material from the XRD pattern. The Raman spectrum is shown in FIG. 7, and it can be obtained from the Raman spectrum that $L_a=4.09$ nm of the disordered carbon material. FIG. 8 is an SEM diagram of the disordered carbon material prepared by the present embodiment. It can be seen from the diagram that the morphology of the disordered carbon material prepared by the present embodiment is irregular block-shaped, and the size is between 0.3 µm to 5 µmc.

The disordered carbon material obtained by the above preparation is used as an active substance of a battery negative electrode material for preparing a sodium-ion battery.

The powder of the prepared disordered carbon material and sodium alginate binder are mixed according to a mass ratio of 95:5, an appropriate amount of water is added for grinding to form a slurry, and then the uniform slurry is evenly coated on the current collector of aluminum foil. The aluminum foil is cut into (8×8) mm² pieces after being dried.

The electrode pieces are dried at 120° C. for 10 hours under vacuum and then transferred to a glove box for standby.

Figure 9A:
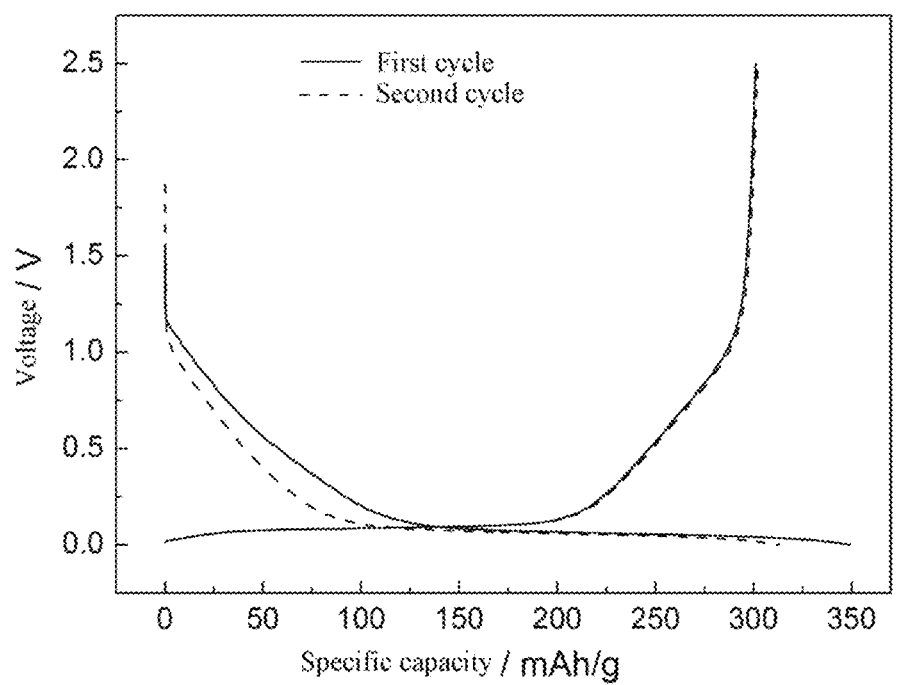
FIG. 9a is a constant current charge-discharge curve diagram illustrating a sodium-ion battery according to embodiment 3 of the present disclosure.
Figure 9B:
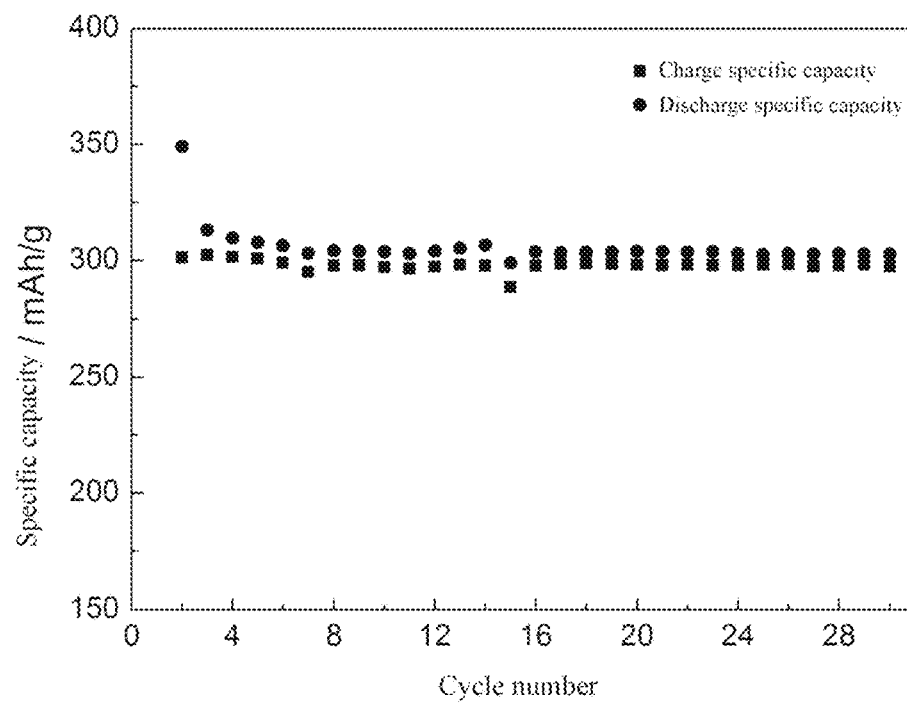
FIG. 9b is a cycle curve diagram illustrating a sodium-ion battery according to embodiment 3 of the present disclosure.

A simulated battery is assembled in the glove box under Ar atmosphere. Metal sodium is used as a counter electrode, 1 mole NaPF6 dissolved in 1 L of vinyl carbonate and diethyl carbonate solution with a volume ratio of 1:1 is used as an electrolyte, and a CR2032 coin cell is assembled. Using a constant current charge-discharge mode, a charge-discharge test is performed at a current density of C/10. Under conditions of a bottom end-of-discharge voltage of 0V and an upper end-of-charge voltage of 2.5V, test results are shown in FIGS. 9a and 9b. The reversible specific capacity is 301.2 mAh/g, the initial coulombic efficiency is 88.6%, and the cycling performance is stable.

Embodiment 4

Figure 10:
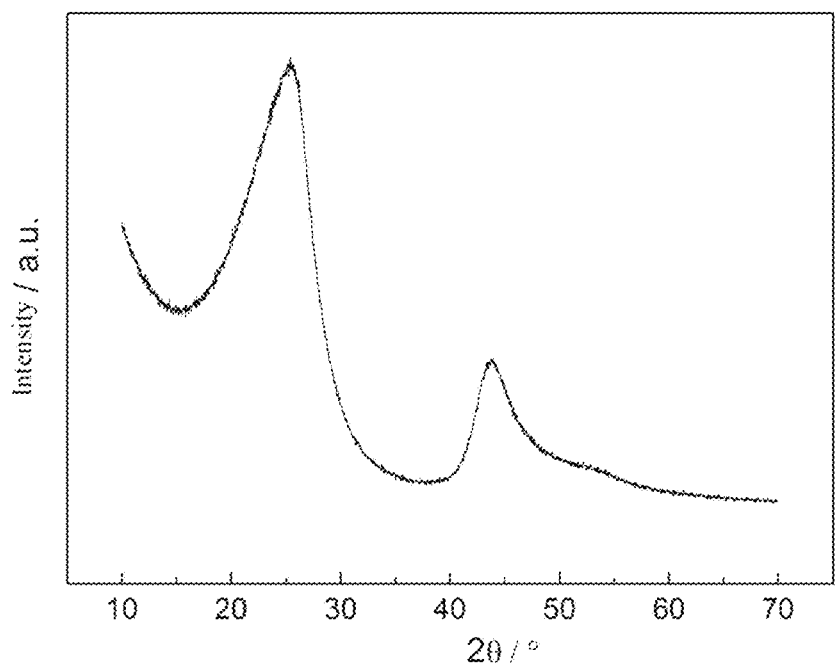
FIG. 10 is an XRD pattern illustrating a disordered carbon according to embodiment 4 of the present disclosure.
Figure 11:
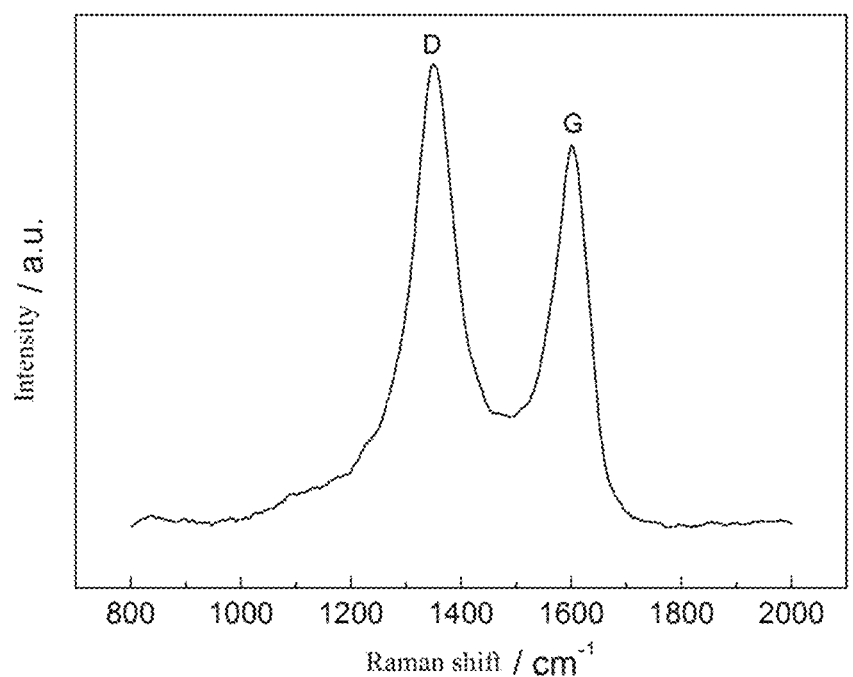
FIG. 11 is a Raman spectrum illustrating a disordered carbon material according to embodiment 4 of the present disclosure.
Figure 12:
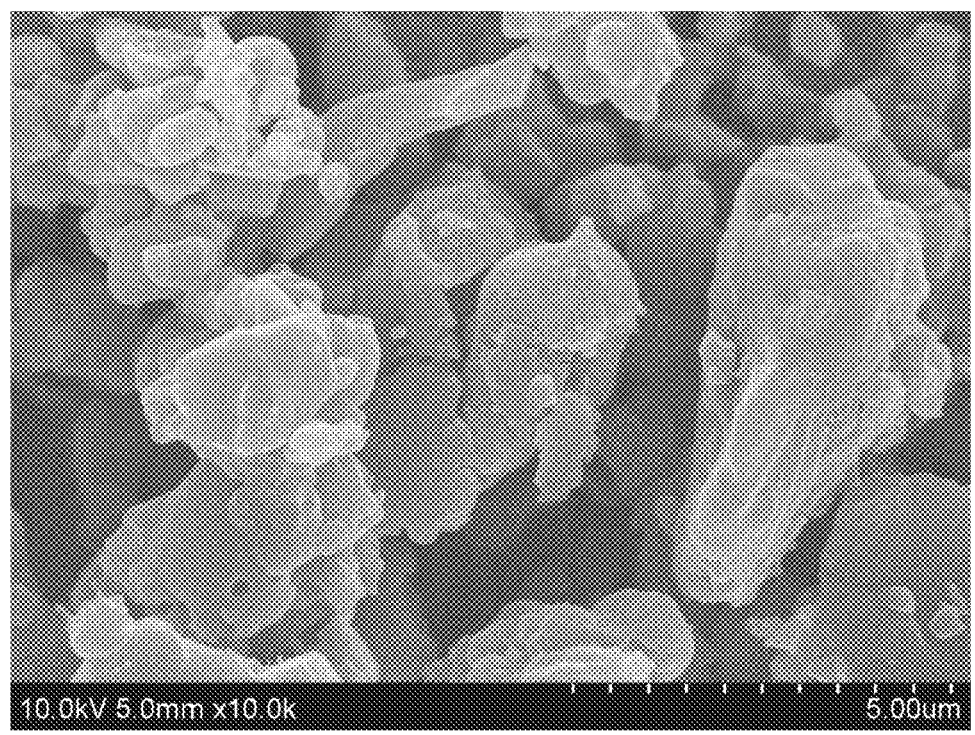
FIG. 12 is an SEM diagram illustrating a disordered carbon material according to embodiment 4 of the present disclosure.

2 g of pitch raw material is weighed, put in a crucible, and placed into a muffle furnace. The temperature is raised to 300° C. at a rate of 3° C./min, and kept for 3 hours to obtain pre-oxidized pitch. The mass percentage of the pre-oxidized pitch is 103.9%. The preoxidized pitch is put in a crucible and placed into a tubular furnace after being ground, argon is introduced as a protective gas, then the temperature is raised to 1550° C. at a rate of 3° C./min, and kept for 2 hours; and then the material is naturally cooled to room temperature and taken out to obtain the final disordered carbon material with a carbon yield rate of 66.1%. The XRD pattern of the disordered carbon material obtained by the carbonized pitch is shown in FIG. 10. It may be seen that $d_{002}$=0.351 nm and $L_c$=1.196 nm of the material from the XRD pattern. The Raman spectrum is shown in FIG. 11, and it may be seen that $L_a$=3.79 nm of the disordered carbon material from the Raman spectrum. FIG. 12 is an SEM diagram of the disordered carbon material prepared by the present embodiment. It may be seen from the diagram that the morphology of the disordered carbon material prepared by the present embodiment is irregular block-shaped, and the size is 0.5-5 microns.

Figure 13A:
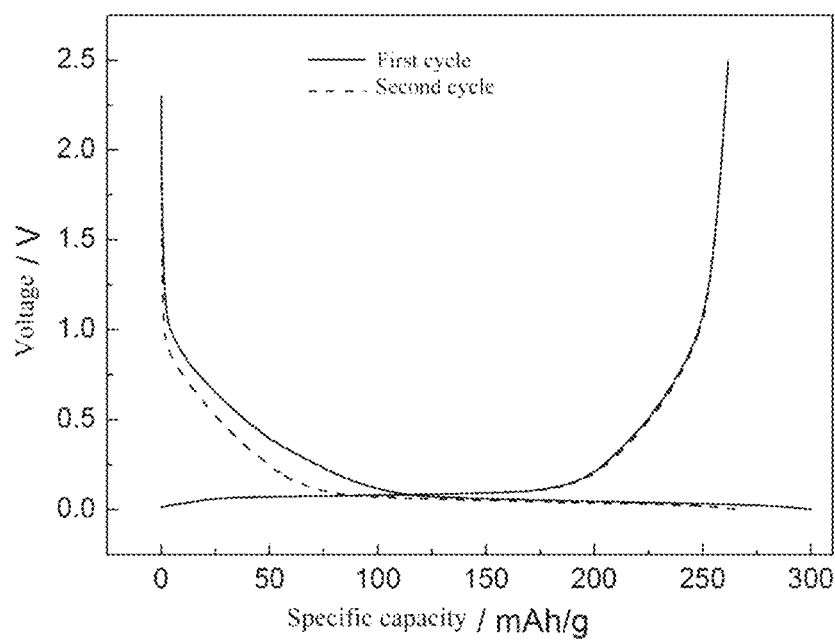
FIG. 13a is a constant current charge-discharge curve diagram illustrating a sodium-ion battery according to embodiment 4 of the present disclosure.
Figure 13B:
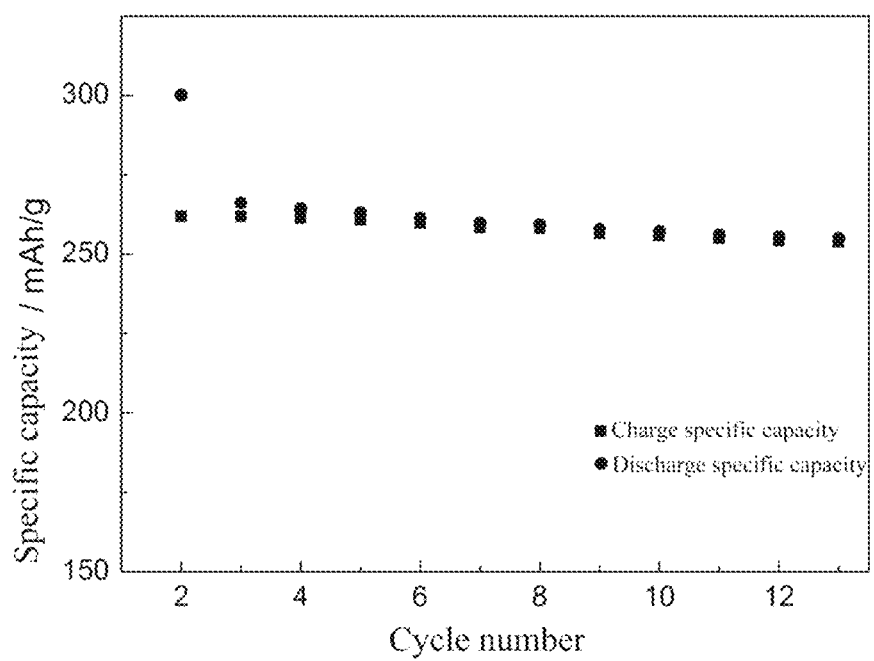
FIG. 13b is a cycle curve diagram illustrating a sodium-ion battery according to embodiment 4 of the present disclosure.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V. Test results are shown in FIG. 13a and FIG. 13b, the reversible specific capacity is 261.8 mAh/g, the initial coulombic efficiency is 87.2%, and the cycle performance is stable.

Embodiment 5

Figure 14:
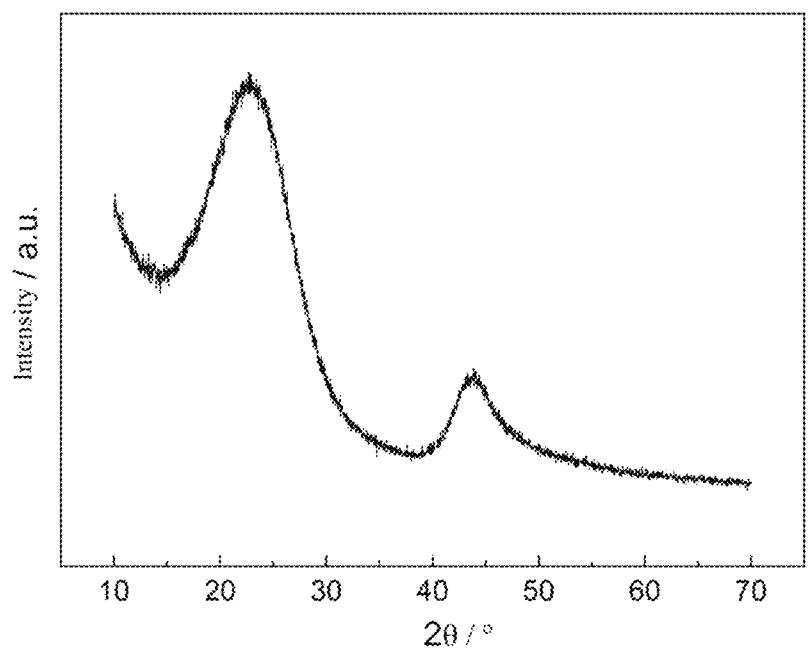
FIG. 14 is an XRD pattern illustrating a disordered carbon according to embodiment 5 of the present disclosure.
Figure 15:
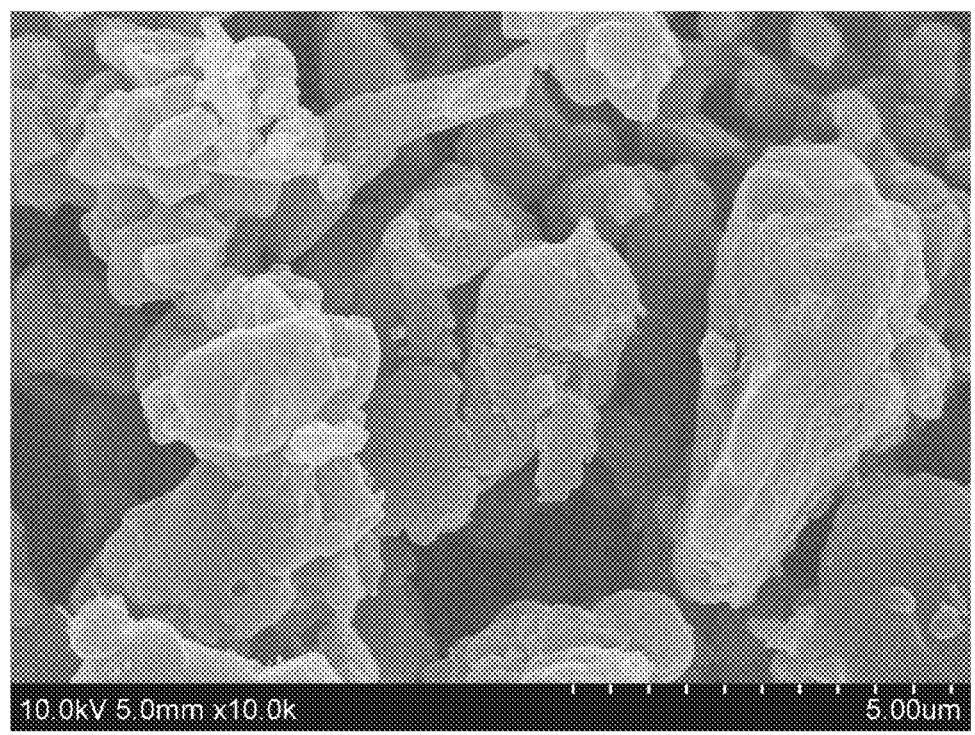
FIG. 15 is an SEM diagram illustrating a disordered carbon material according to embodiment 5 of the present disclosure.

2 g of pitch raw material is weighed, put in a crucible, and placed into a muffle furnace. The temperature is raised to 300° C. at a rate of 3° C./min, and kept for 4 hours to obtain pre-oxidized pitch. The mass percentage of the pre-oxidized pitch is 99.38%. The preoxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 58.5%. The XRD pattern of the disordered carbon material obtained by the carbonized pitch is shown in FIG. 14. It may be seen that $d_{002}$=0.389 nm and $L_c$=0.995 nm of the material from the XRD pattern. FIG. 15 is an SEM diagram of the disordered carbon material prepared by the present embodiment. It may be seen from the diagram that the morphology of the disordered carbon material prepared by the present embodiment is irregular block-shaped, and the size is between 0.3-5 microns.

Figure 16:
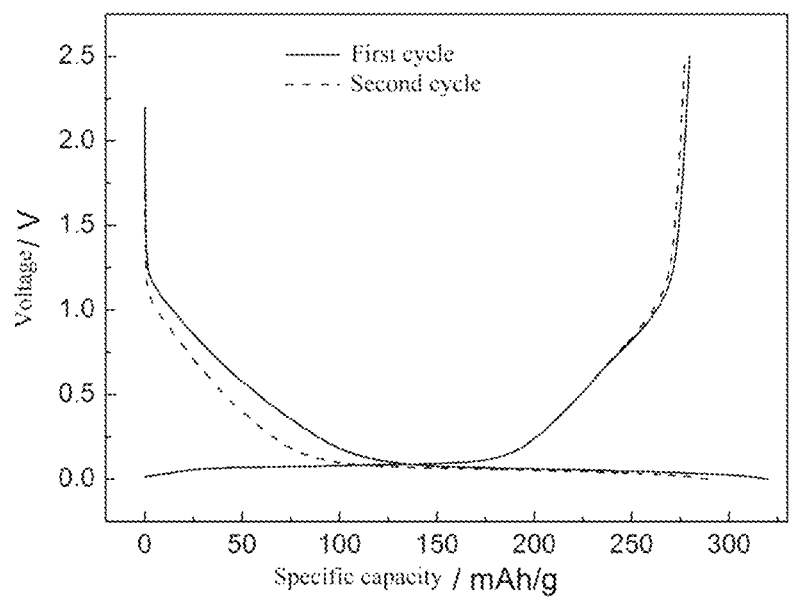
FIG. 16 is a constant current charge-discharge curve diagram illustrating a sodium-ion battery according to embodiment 5 of the present disclosure.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V. Test results are shown in FIG. 16, the reversible specific capacity is 279.8 mAh/g, the initial coulombic efficiency is 87.5%, and the cycle performance is stable.

Embodiment 6

Figure 17:
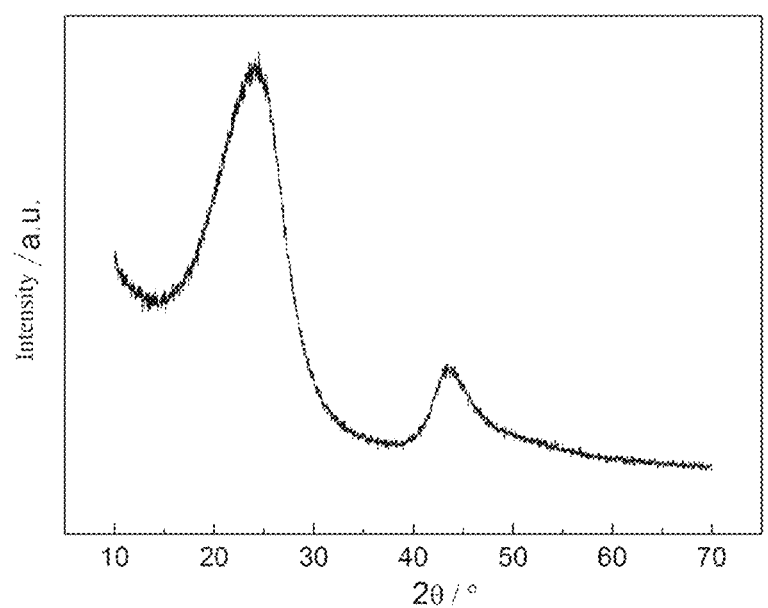
FIG. 17 is an XRD pattern illustrating a disordered carbon according to embodiment 6 of the present disclosure.

2 g of pitch raw material is weighed, put in a crucible, and placed into a muffle furnace. The temperature is raised to 200° C. at a rate of 3° C./min, and kept for 3 hours to obtain pre-oxidized pitch. The mass percentage of the pre-oxidized pitch is 104%. The preoxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 76.5%. The XRD pattern of the disordered carbon material obtained by the carbonized pitch is shown in FIG. 17. It may be seen that $d_{002}$=0.368 nm and $L_c$=1.161 nm of the material from the XRD pattern.

Figure 18:
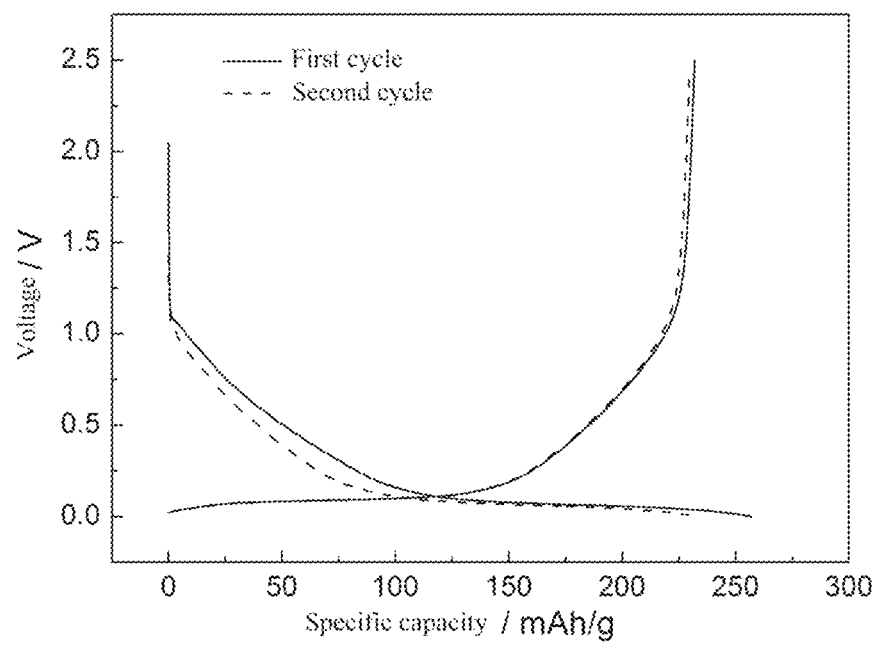
FIG. 18 is a constant current charge-discharge curve diagram illustrating a sodium-ion battery according to embodiment 6 of the present disclosure.
Figure 19:
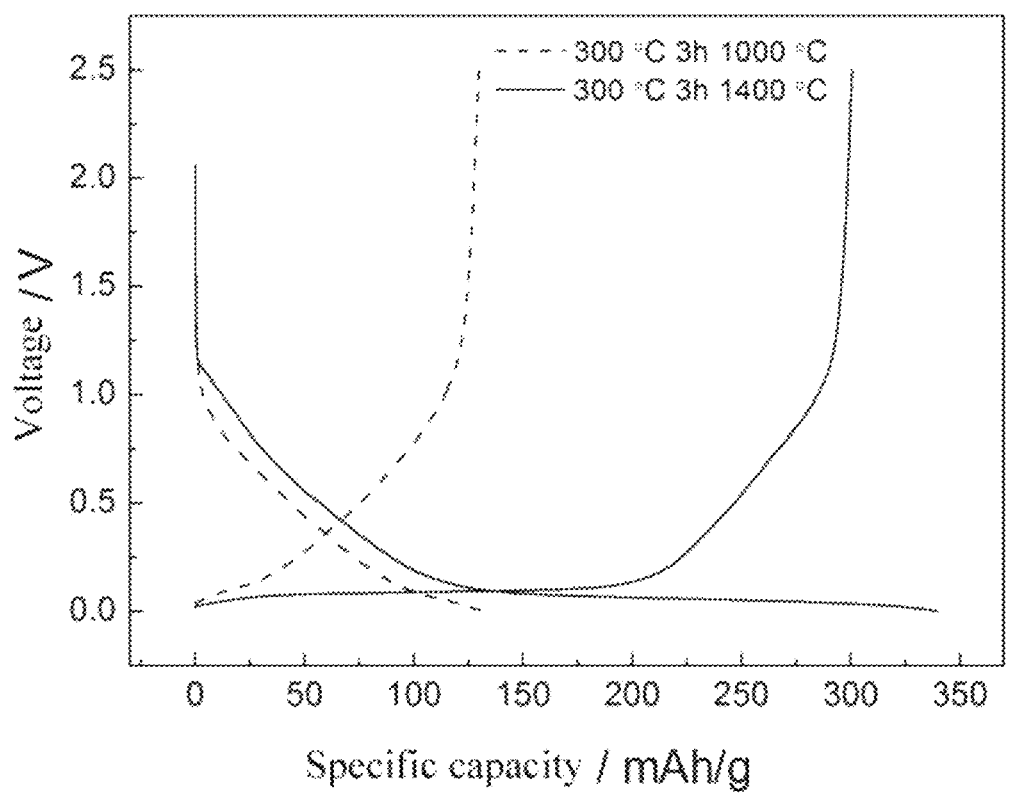
FIG. 19 is a comparison diagram of constant current charge-discharge curves illustrating sodium-ion batteries according to embodiments 3 and 12 of the present disclosure.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V. Test results are shown in FIG. 18, the reversible specific capacity is 228.8 mAh/g, the initial coulombic efficiency is 90.3%, and the cycle performance is stable.

Embodiment 7

2 g of pitch raw material is weighed, put in a crucible, and placed into a muffle furnace. The temperature is raised to 250° C. at a rate of 3° C./min, and kept for 3 hours to obtain pre-oxidized pitch. The mass percentage of the pre-oxidized pitch is 108.6%. The preoxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 69.1%.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V, and results are shown in Table 1 below.

Embodiment 8

2 g of pitch raw material is weighed, put in a crucible, and placed into a muffle furnace. The temperature is raised to 350° C. at a rate of 3° C./min, and kept for 3 hours to obtain pre-oxidized pitch. The mass percentage of the pre-oxidized pitch is 67.8%. The preoxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 57.9%.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V, and results are shown in Table 1 below.

Embodiment 9

2 g of pitch raw material is weighed, put in a crucible, and placed into a muffle furnace. The temperature is raised to 300° C. at a rate of 3° C./min, and kept for 2 hours to obtain pre-oxidized pitch. The mass percentage of the pre-oxidized pitch is 101%. The preoxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 64.1%.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V, and results are shown in Table 1 below.

Embodiment 10

2 g of pitch raw material is weighed, put in a crucible, and placed into a muffle furnace. The temperature is raised to 300° C. at a rate of 3° C./min, and kept for 5 hours to obtain pre-oxidized pitch. The mass percentage of the pre-oxidized pitch is 98.3%. The preoxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 62%.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V, and results are shown in Table 1 below.

Embodiment 11

2 g of pitch raw material is weighed, put in a crucible, and placed into a muffle furnace. The temperature is raised to 300° C. at a rate of 3° C./min, and kept for 6 hours to obtain pre-oxidized pitch. The mass percentage of the pre-oxidized pitch is 99.7%. The preoxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 63.7%.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V, and results are shown in Table 1 below.

Embodiment 12

2 g of pitch raw material is weighed, put in a crucible, and placed into a muffle furnace. The temperature is raised to 300° C. at a rate of 3° C./min, and kept for 3 hours to obtain pre-oxidized pitch. The mass percentage of the pre-oxidized pitch is 103.9%. The preoxidized pitch is put in a crucible and placed into a tubular furnace after being ground, argon is introduced as a protective gas, then the temperature is raised to 1000° C. at a rate of 3° C./min, and kept for 2 hours; and then the material is naturally cooled to room temperature and taken out to obtain the final disordered carbon material with a carbon yield rate of 66.9%.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V, and results are shown in Table 1 below.

Embodiment 13

2 g of pitch raw material is weighed, put in a crucible, and placed into a muffle furnace. The temperature is raised to 300° C. at a rate of 3° C./min, and kept for 3 hours to obtain pre-oxidized pitch. The mass percentage of the pre-oxidized pitch is 103.9%. The preoxidized pitch is put in a crucible and placed into a tubular furnace after being ground, argon is introduced as a protective gas, then the temperature is raised to 1200° C. at a rate of 3° C./min, and kept for 2 hours; and then the material is naturally cooled to room temperature and taken out to obtain the final disordered carbon material with a carbon yield rate of 65.3%.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V, and results are shown in Table 1 below.

Embodiment 14

2 g of pitch raw material is weighed, put in a crucible, and placed into a muffle furnace. The temperature is raised to 300° C. at a rate of 3° C./min, and kept for 3 hours to obtain pre-oxidized pitch. The mass percentage of the pre-oxidized pitch is 102.88%. The preoxidized pitch is put in a crucible and placed into a tubular furnace after being ground, argon is introduced as a protective gas, then the temperature is raised to 1400° C. at a rate of 3° C./min, and kept for 2 hours; and then the material is naturally cooled to room temperature and taken out to obtain the final disordered carbon material with a carbon yield rate of 67.4%.

The disordered carbon material obtained by the above preparation is used as an active substance of a battery negative electrode material for preparing a sodium-ion battery, and an electrochemical charge and discharge test is performed. The preparation process and test method are the same as those in embodiment 3. The range of the test voltage is 0-2.5 V, and results are shown in Table 1 below.

TABLE 1 relevant conditions and specific capacities of negative electrode materials prepared in different embodiments

| embodiment | pre-oxidation condition | carbonization temperature | carbon yield rate | efficiency in the first cycle |
|---|---|---|---|---|
| 3 | air 300° C. for 3 h | 1400° C. | 67.4% | 88.6% |
| 4 | air 300° C. for 3 h | 1550° C. | 66.1% | 87.2% |
| 5 | air 300° C. for 4 h | 1400° C. | 58.5% | 87.5% |
| 6 | air 200° C. for 3 h | 1400° C. | 76.5% | 90.3% |
| 7 | air 250° C. for 3 h | 1400° C. | 69.1% | 87.1% |
| 8 | air 350° C. for 3 h | 1400° C. | 57.9% | 86.3% |
| 9 | air 300° C. for 2 h | 1400° C. | 64.1% | 87.2% |
| 10 | air 300° C. for 5 h | 1400° C. | 62.0% | 89.7% |
| 11 | air 300° C. for 6 h | 1400° C. | 63.7% | 86.9% |
| 12 | air 300° C. for 3 h | 1000° C. | 66.9% | 45.0% |
| 13 | air 300° C. for 3 h | 1200° C. | 65.3% | 82.1% |
| 14 | oxygen 300° C. for 3 h | 1400° C. | 67.4% | 86.3% |

The negative electrode material for the sodium-ion secondary battery provided by the above embodiments of the present disclosure has advantages of low raw material cost, simple preparation process, high production efficiency and suitability for large-scale production. The disordered carbon material obtained by the preparation method provided by the embodiments of the present disclosure is used as the negative electrode active material for the sodium-ion battery, the measured sodium-ion battery has high reversible capacity and energy density, excellent rate performance, stable cycle performance and good safety performance, and it may be used not only for power supplies of mobile equipment and electric vehicles, but also for large-scale energy storage equipment such as renewable energy generation, smart grid peak regulation, distributed power stations, backup power supplies or communication base stations.

The specific embodiments described above have further explained the purpose, technical solution and beneficial effects of the present disclosure in detail. It should be understood that the above is only specific embodiments of the present disclosure and is not used to limit the scope of protection of the present disclosure. Any modification, equivalent substitution, improvement, etc., made within the spirit and principles of the present disclosure should be included in the scope of protection of the present disclosure.

What is claimed is:

1. A preparation method for a pitch-based negative electrode material for a sodium-ion battery, comprising:
    putting a pitch precursor into a muffle furnace for pre-oxidization at a temperature of 200° C.-350° C. for 2-6 hours to obtain pre-oxidized pitch, wherein the pitch precursor is not treated prior to being put into the muffle furnace;
    putting the pre-oxidized pitch into a high-temperature carbonization furnace, wherein the temperature is raised to 1300° C.-1600° C. at a heating rate of 0.5° C./min-5° C./min, and performing heat treatment on the pre-oxidized pitch in an inert atmosphere for 1-10 hours, so that the pre-oxidized pitch undergoes carbonization reactions; wherein oxygen in the pre-oxidized pitch is used for breaking an ordered structure of the pre-oxidized pitch and forming a disordered structure with wedge-shaped voids in a process of carbonization of the pre-oxidized pitch; and
    cooling the pre-oxidized pitch to room temperature to obtain an irregular block-shaped disordered carbon material, which is the negative electrode material for the sodium-ion battery.

2. The preparation method according to claim 1, wherein the pre-oxidation is performed in an air or oxygen atmosphere.

3. The preparation method according to claim 2, wherein the pre-oxidation temperature is 280° C.-320° C.

4. The preparation method according to claim 2, wherein the pre-oxidation temperature is 300° C.

5. The preparation method according to claim 4, wherein the pitch precursor is one or a mixture of a plurality of coal tar pitch, petroleum pitch and natural pitch.

6. A negative electrode material for a sodium-ion battery prepared by the preparation method according to claim 5, wherein the negative electrode material for the sodium-ion battery is the irregular block-shaped disordered carbon material.

7. The negative electrode material for the sodium-ion battery according to claim 6, wherein the irregular block-shaped disordered carbon material has a size of 0.5 μm-3 μm, a $d_{002}$ value of 0.36 nm-0.39 nm, an $L_c$ value of 0.9 nm-1.2 nm, and an $L_a$ value of 3 nm-5 nm, and internal carbon layers are arranged in a disorderly stacking manner to form a microstructure with the wedge-shaped voids, which constitutes active sites for sodium storage.

8. A negative electrode of a sodium-ion battery, comprising:
    a current collector, a binder and the negative electrode material of the sodium-ion battery according to claim 7, wherein the binder and the negative electrode material are coated on the current collector.

9. The preparation method according to claim 1, wherein the pre-oxidation temperature is 280° C.-320° C.

10. The preparation method according to claim 1, wherein the pre-oxidation temperature is 300° C.

11. The preparation method according to claim 1, wherein the pitch precursor is one or a mixture of a plurality of coal tar pitch, petroleum pitch and natural pitch.

12. A negative electrode material for a sodium-ion battery prepared by the preparation method according to claim 1, wherein the negative electrode material for the sodium-ion battery is the irregular block-shaped disordered carbon material.

13. The negative electrode material for the sodium-ion battery according to claim 12, wherein the irregular block-shaped disordered carbon material has a size of 0.5 μm-3 μm, a $d_{002}$ value of 0.36 nm-0.39 nm, an $L_c$ value of 0.9 nm-1.2 nm, and an $L_a$ value of 3 nm-5 nm, and internal carbon layers are arranged in a disorderly stacking manner to form a microstructure with the wedge-shaped voids, which constitutes active sites for sodium storage.

14. A negative electrode of a sodium-ion battery, comprising: a current collector, a binder and the negative electrode material of the sodium-ion battery according to claim 12, wherein the binder and the negative electrode material are coated on the current collector.

15. A negative electrode of a sodium-ion battery, comprising: a current collector, a binder and the negative electrode material of the sodium-ion battery according to claim 13, wherein the binder and the negative electrode material are coated on the current collector.

16. A negative electrode material for a sodium-ion battery prepared by the preparation method according to claim 2, wherein the negative electrode material for the sodium-ion battery is the irregular block-shaped disordered carbon material.

17. A negative electrode material for a sodium-ion battery prepared by the preparation method according to claim 9, wherein the negative electrode material for the sodium-ion battery is the irregular block-shaped disordered carbon material.

18. A negative electrode material for a sodium-ion battery prepared by the preparation method according to claim 10, wherein the negative electrode material for the sodium-ion battery is the irregular block-shaped disordered carbon material.

19. A negative electrode material for a sodium-ion battery prepared by the preparation method according to claim 11, wherein the negative electrode material for the sodium-ion battery is the irregular block-shaped disordered carbon material.

\* \* \* \* \*

UNITED STATES PATENT AND TRADEMARK OFFICE
CERTIFICATE OF CORRECTION

PATENT NO. : 11,670,774 B2
APPLICATION NO. : 16/650606
DATED : June 6, 2023
INVENTOR(S) : Yaxiang Lu et al.

Page 1 of 1

It is certified that error appears in the above-identified patent and that said Letters Patent is hereby corrected as shown below:

In the Claims

| | | | |
|---|---|---|---|
| Claim 1, | Column 11, | Lines 56-57, | change "for pre-oxidization at" to --for pre-oxidation at-- |
| Claim 4, | Column 12, | Line 14, | change "claim 2, wherein" to --claim 3, wherein-- |

Signed and Sealed this
Ninth Day of April, 2024

Katherine Kelly Vidal
*Director of the United States Patent and Trademark Office*